United States Patent [19]

Trzmiel et al.

[11] Patent Number: 5,120,278
[45] Date of Patent: Jun. 9, 1992

[54] ARRANGEMENT FOR THE TENSIONING AND ADJUSTING OF A CAMSHAFT CHAIN DRIVE

[75] Inventors: Alfred Trzmiel, Grafenberg; Wolfgang Stephan, Zizishausen; Johann-Georg Ulrich, Weissach; Rolf Frech, Weissach-Flacht; Freidhelm Hage, Ditzingen, all of Fed. Rep. of Germany

[73] Assignees: Dr. Ing. h.c.F. Porsche AG; Hydraulik-Ring GmbH, Fed. Rep. of Germany; a part interest

[21] Appl. No.: 663,670

[22] Filed: Mar. 4, 1991

[30] Foreign Application Priority Data

Mar. 6, 1990 [DE] Fed. Rep. of Germany ....... 4006910

[51] Int. Cl.⁵ .............................................. F16H 7/08
[52] U.S. Cl. .................................... 474/136; 474/110
[58] Field of Search .................... 474/101, 109–111, 474/113–117, 133–135, 136–137, 138, 140

[56] References Cited

U.S. PATENT DOCUMENTS

| 3,964,331 | 6/1976 | Oldfield ............................ 474/110 |
| 4,681,062 | 7/1987 | Shibata et al. .................... 118/410 |
| 4,828,536 | 5/1989 | Ampferer ......................... 474/110 |

FOREIGN PATENT DOCUMENTS

| 0294559 | 12/1988 | European Pat. Off. . |
| 3421028 | 12/1985 | Fed. Rep. of Germany . |
| 3534446 | 4/1987 | Fed. Rep. of Germany . |

Primary Examiner—Thuy M. Bui
Attorney, Agent, or Firm—Evenson, Wands, Edwards, Lenahan & McKeown

[57] ABSTRACT

An internal-combustion engine has a camshaft drive in which the outlet camshaft driven by the crankshaft drives the inlet camshaft via a chain. For the tensioning of the chain, two hydraulic pistons are pressed in opposite directions with respect to one another against the loose end and the load end of the interior side of the chain. For adjustment of the relative camshaft rotating position, the unit consisting of the hydraulic piston and the chain is shifted transversely to the camshafts so that the loose end is shortened and the load end is lengthened, or vice versa.

24 Claims, 4 Drawing Sheets

ARRANGEMENT FOR THE TENSIONING AND ADJUSTING OF A CAMSHAFT CHAIN DRIVE

BACKGROUND AND SUMMARY OF THE INVENTION

The present invention relates to an arrangement for the tensioning and adjusting of a wind-around drive, e.g. a chain drive, by means of which a camshaft of an internal combustion (IC) engine drives a second camshaft, with a relative rotational position of the camshafts being changed by adjustment of the chain drives.

A tensioning and adjusting arrangement for a drive is shown in German Patent Document DE-OS 34 21 028. A tensioning arrangement is applied to a chain drive which winds around the two camshafts of an internal-combustion engine. This tensioning arrangement comprises a hydraulic piston bracing the load end and the loose end of the chain. As an alternative, two separate tensioning devices may also act upon the loose end and the load end of the chain. In addition to the bracing, both arrangements also change the relative rotation of the two camshafts with respect to one another by a lengthening of the load end and a corresponding shortening of the loose end, or vice versa. In this manner, the control times of the inlet valves may be variable, and an optimal performance and low exhaust gas emission can be achieved over the whole rotational speed range of the internal-combustion engine.

It is an object of the present invention to further improve a tensioning and adjusting arrangement of the aforementioned such that a high operational reliability is ensured at low cost.

The foregoing object has been achieved by providing a tensioning arrangement which acts transversely with respect to the chain and which, for adjusting the chain, is shifted transversely to it in such a manner that the loose end of the chain is lengthened and the load end is shortened, or the loose end is shortened and the load end is lengthened.

If a separation of functions takes place such that a tensioning arrangement for the chain is provided which, for adjusting the chain, is shifted transversely to it, the chain is always maintained under tension irrespective of possible disturbances in the adjusting mechanism or its control. This feature ensures a lasting, although not optimal operation of the internal-combustion engine.

In another advantageous further embodiment of the invention, the tensioning and adjusting arrangement comprises an exterior hollow piston, an interior hollow piston which is longitudinally guided in the exterior hollow piston, and a coil spring which is centrally braced between the two pistons as well as a hydraulic connection on the central hollow space. The exterior piston has a second hydraulic connection on its exterior side. When pressure acts on this hydraulic connection, the tensioning device can be shifted transversely with respect to the chain.

BRIEF DESCRIPTION OF THE DRAWINGS

These and other objects, features and advantages of the present invention will become more apparent from the following detailed description of presently preferred embodiments when taken in conjunction with the accompanying drawings, wherein.

DETAILED DESCRIPTION OF THE DRAWINGS

Figure 1:
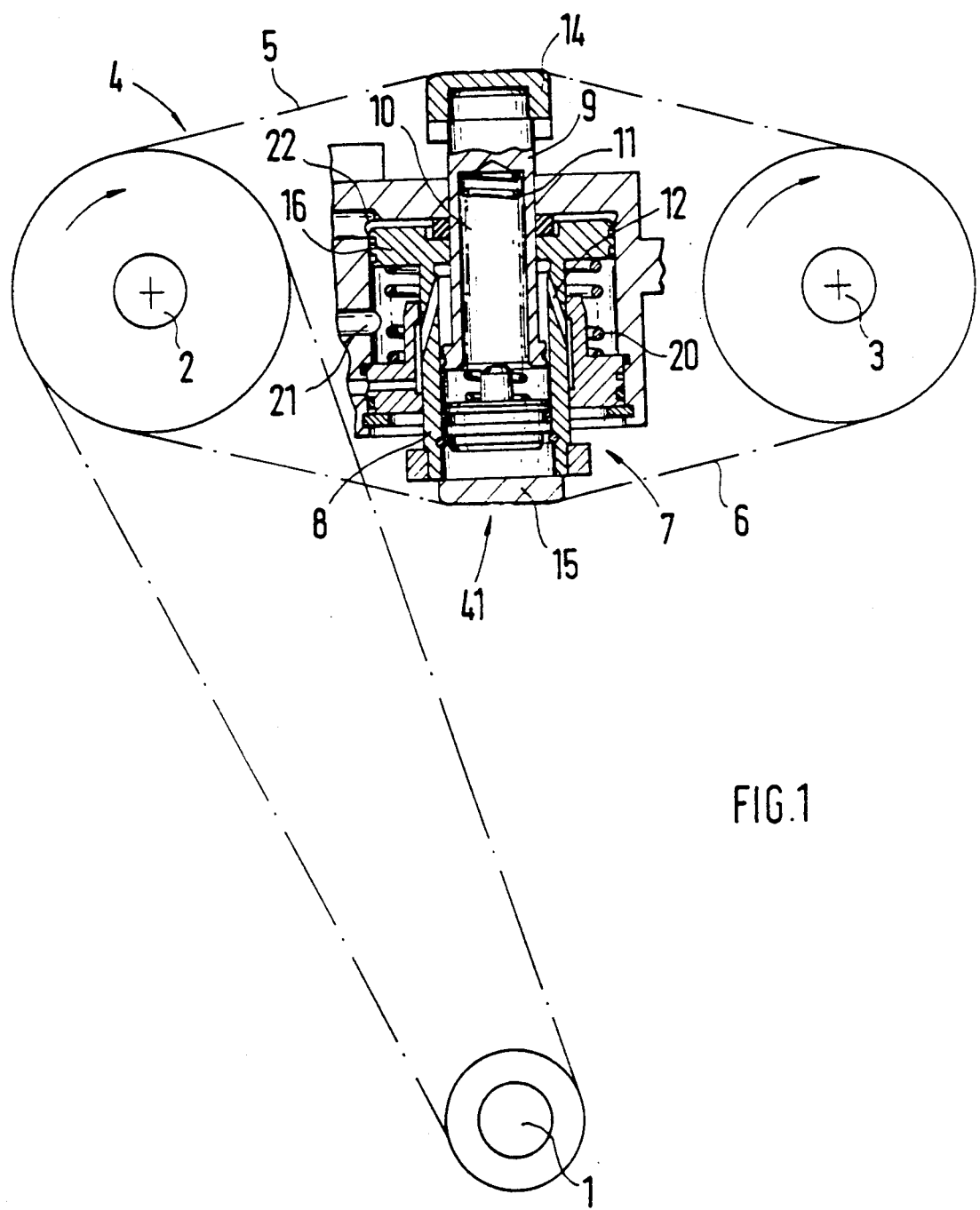
FIG. 1 is a schematic view of a camshaft drive with a tensioning and adjusting arrangement.

A crankshaft 1 of an internal-combustion (IC) engine, via a toothed belt or a chain shown in phantom or dot-dash lines, drives an outlet camshaft 2 actuating outlet valves (not shown). By way of a chain 4 also shown in dot-dash lines, the outlet camshaft 2 drives an inlet camshaft 3 controlling inlet valves (not shown). A hydraulic tensioning arrangement designated generally by the numeral 7 is applied to the load end 5 and the loose end 6 of the chain 4 from the direction of the interior side of the chain 4.

The tensioning arrangement 7 comprises a hollow exterior hydraulic piston 8, an interior hollow hydraulic piston 9 which is longitudinally guided in the exterior hydraulic piston 8 and a coil compression spring 11 which is braced into a hollow space 10 between the two hydraulic pistons 8, 9. In addition to the force of the coil compression spring 11, the hydraulic pistons 8, 9 are acted upon by hydraulic pressure by way of a pressure connection 12 on an annular space 13 between the two hydraulic pistons 8, 9. On the interior hydraulic piston 9, a tensioning shoe 14 is fastened and is applied to the load end 5 of the chain 4. A tensioning shoe 15 is fastened on the end side in the exterior hydraulic piston 8 and presses on the loose end 6 of the chain. On the other end of the exterior hydraulic piston 8, a collar 16 is provided which, in a sealed manner, is longitudinally guided in a bore 17 of the housing 18.

Figure 2:
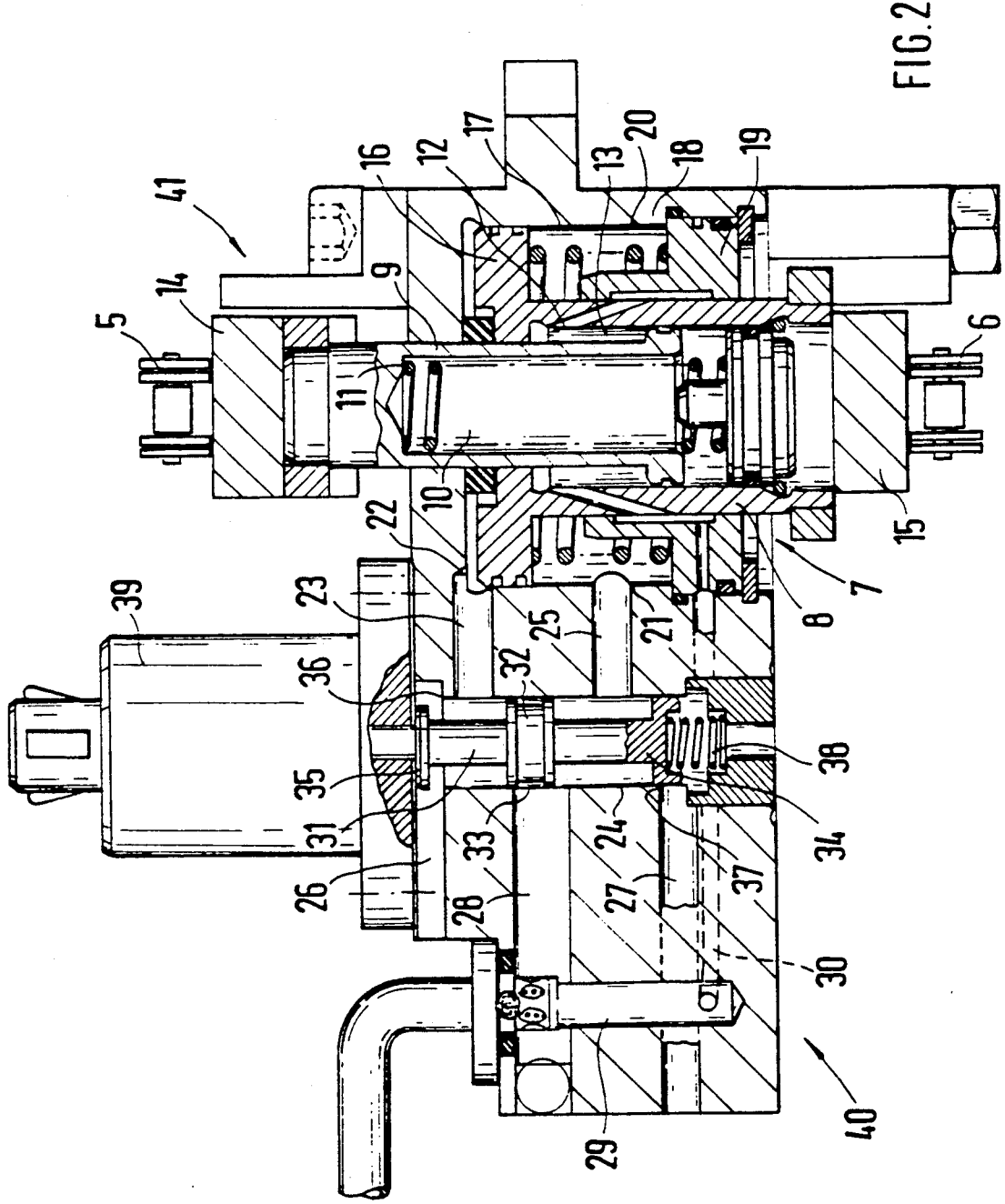
FIG. 2 is a cross-sectional view of the tensioning and adjusting arrangement of FIG. 1 in a first position.

A coil compression spring 20 is braced between the collar 16 and a guiding sleeve 19 fastened in the housing 18 is shown clearly in FIG. 2. The bore 17 of the housing 18 has a second pressure connection 21. A third pressure connection 22 is disposed on the bore 17 on the front side on the hydraulic piston 8. This third pressure connection 22, by way of a pressure duct 23, is connected to a housing bore 24. The second pressure connection 21, by way of another pressure duct 25, is also connected to the housing bore 24. Return flow ducts 26 and 27 lead into the housing bore 24 on both end sides. A connecting duct 28 to a main duct 29 supplied by a pump (not shown) is disposed approximately in the center on the housing bore 24, from which, by way of a pressure duct 30, the first pressure connection 12 is constantly acted upon by hydraulic pressure.

The pressure ducts 23, 25 leading to the two pressure connections 21, 22 are alternately acted upon by hydraulic pressure. For this purpose, a control slide 31 is used which is longitudinally guided in the housing bore 24 and which, via a control piston 32, controls the outlet point 33 of the connecting duct 38 to the housing bore 24. In the position shown in FIG. 2, the hydraulic pressure communicates with the pressure duct 25. A connection to the pressure duct 23 is prevented by the control piston 32 which is sealingly guided in the housing bore 24. At the same time, the lower end of the housing bore 24 is closed off by a lower valve cylinder 34. The second valve cylinder 35 has been moved out of the upper end of the housing bore 24 so that valve 36 is open between the pressure connection 22 and the return flow line 26.

Figure 3:
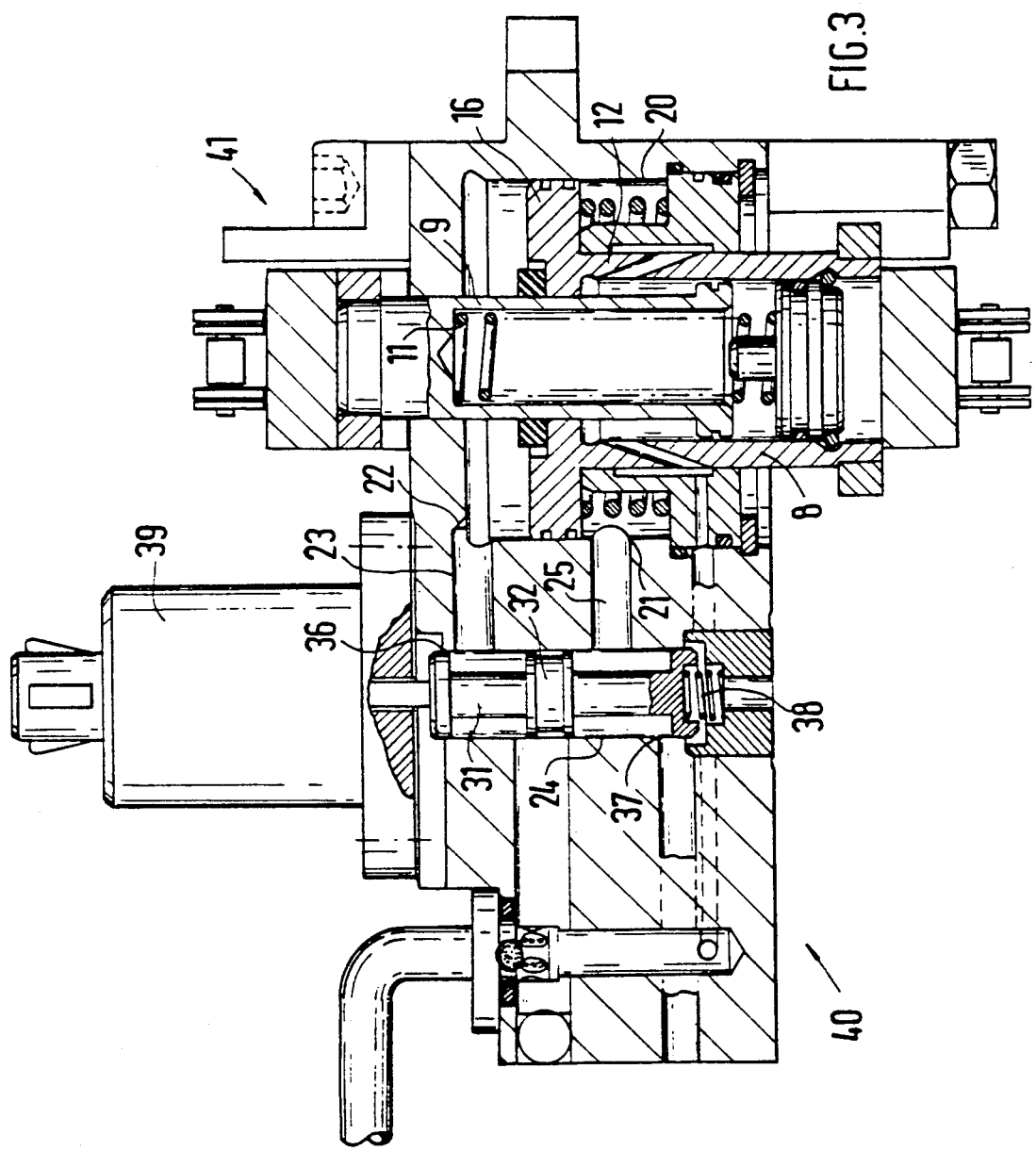
FIG. 3 is a view of the tensioning and adjusting arrangement of FIGS. 1 and 2 in a second position.

Conversely, according to FIG. 3, the upper valve 36 is shut, and the lower valve 37 is open. Therefore, according to the position of the control slide 31, the pressure ducts 23, 24 are used alternately for the pressure buildup and as a return flow line. The control slide 31, which is axially prestressed by a spring 38, is axially shifted into the two possible switching positions by an electromagnet 39.

If required, the change-over of the pressure supply for the pressure ducts 23, 25 may also take place continuously so that the control piston 32 can take up any arbitrary intermediate position, and the pressure buildup in the pressure ducts 23, 24 can take place proportionally to a parameter of the internal-combustion engine controlling the power supply of the electromagnet 39.

In order to avoid unnecessarily high adjusting forces which occur when the hydraulic oil is cold and still viscous, the electromagnet will not be switched before the temperature of the internal-combustion engine is above approximately 40° C.

The position of the collar 16 serving as the adjusting member can be sensed by a sensor whose signal can be used as a test signal for the operatability of the adjusting arrangement or as a control variable when adjustment of the chain is continuous. In the case of a defective adjusting function, the inlet camshaft is automatically brought into the relative rotating position which it normally takes up only during an idling of the internal-combustion engine.

For internal-combustion engines with two cylinder banks, it may be advantageous for reasons relating to space and cost to separate the tensioning and adjusting arrangement into a control part designated generally by the numeral 40 and two tensioning and adjusting parts 41 arranged on the two cylinder banks. The control part 40 essentially comprises the main duct 29, the connecting duct 28 and the valves 36, 37 as well as the control slide 31 with the electromagnet 39 which controls them. The tensioning and adjusting part 41 is formed by the two hydraulic pistons 8, 9, the pressure connections 12, 21, 22, as well as the coil compression springs 11, 20.

Instead of the camshaft drive with a chain 4, a toothed belt may be used which is similarly controlled by the tensioning and adjusting arrangement in accordance with the present invention.

Figure 4:
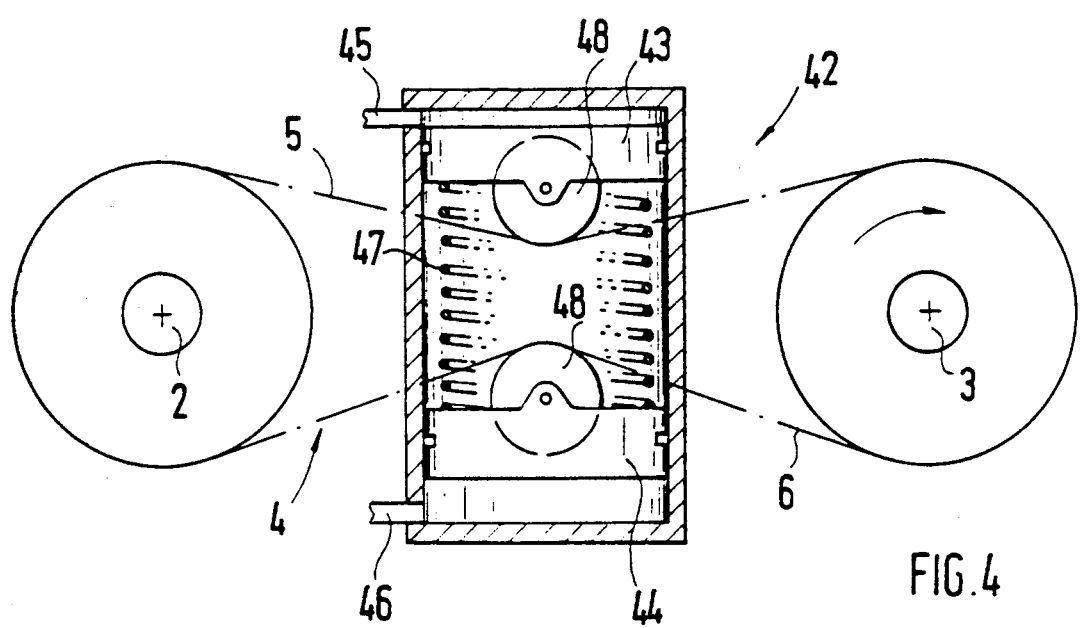
FIG. 4 is a schematic view of an alternative embodiment of the tensioning arrangement in accordance with the present invention.

According to FIGS. 1 to 3, the tensioning arrangement is applied to the interior side of the chain 4. Alternatively, as shown in FIG. 4, it is also possible to brace the chain 4 from the direction of its exterior side. In this embodiment, the tensioning arrangement 42 comprises two hydraulic pistons 43, 44 which are acted upon by pressure via ducts 45, 46, in which case a spring 47 is braced which is situated between the hydraulic pistons 43, 44. Tension rollers 48 for bracing the chain 4 toward the interior are fastened to both hydraulic pistons 43, 44.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for tensioning and timing adjustment of a wind-around drive in which a camshaft of an internal-combustion engine drives a second camshaft, a relative rotational position of the camshafts with respect to one another being changed by adjustment of the drive, comprising a tensioning device having two pistons, one of which is applied to a load end of the drive and the other of which is applied to a loose end of the drive, said device being operatively arranged to act transversely with respect to the drive and configured to be shifted transversely to the drive such that selectively the loose end of the drive is lengthened and the load end of the drive is shortened and the loose end is shortened and the load end is lengthened so as to effect the relative rotational position change of the camshafts and thereby change valve timing.

2. The arrangement according to claim 1, wherein the tensioning device is actuated hydraulically, and an adjusting member associated with the device is used for the adjustment.

3. The arrangement according to claim 2, wherein the adjusting member is actuated by one of a pneumatic, electric and hydraulic mechanism.

4. The arrangement according to claim 3, wherein the pistons constitute a first hydraulic piston longitudinally guided in a housing for bracing the load end of the drive and a second hydraulic piston guided coaxially to the first piston in the housing for bracing the loose end of the drive, and the tensioning device further comprising a first pressure connection situated between the first and second hydraulic pistons.

5. The arrangement according to claim 4, wherein the exterior hydraulic piston, on one end side, has a collar guided in the housing and constituting the adjusting member, and the second pressure connection in the housing is provided on one front surface of the collar, and a third hydraulic connection is provided in the housing on another front surface of the collar.

6. The arrangement according to claim 5, wherein a coil compression spring is braced between the front surface of the collar, and a guide sleeve for the exterior hydraulic piston is fastened in the housing.

7. The arrangement according to claim 2, wherein the tensioning device is actuated hydraulically via a first pressure connection and is adapted to be shifted transversely with respect to the drive by a second pressure connection.

8. The arrangement according to claim 7, wherein in an exterior hollow hydraulic piston, an interior hollow hydraulic piston in longitudinally guided, and a first pressure connection is located at an annulus between the two hydraulic pistons, and a second pressure connection is located at an outside on one of the two hydraulic pistons.

9. The arrangement according to claim 8, wherein a coil compression spring is braced in a central hollow space between the two hydraulic pistons.

10. The arrangement according to claim 9, wherein the exterior hydraulic piston, on one end side, has a collar guided in the housing and constituting the adjusting member, and the second pressure connection in the housing is provided on one front surface of the collar, and a third hydraulic connection is provided in the housing on another front surface of the collar.

11. The arrangement according to claim 8, wherein three pressure ducts lead to the three pressure connections and are supplied with pump pressure by a joint main duct, the pressure duct for the first pressure connection being connected directly to the main duct, the second and third pressure ducts being connected to the main duct by an outlet point controlled by a control slide.

12. The arrangement according to claim 11, wherein the exterior hydraulic piston, on one end side, has a collar guided in the housing and constituting the adjusting member, and the second pressure connection in the housing is provided on one front surface of the collar, and a third hydraulic connection is provided in the housing on another front surface of the collar.

13. The arrangement according to claim 11, wherein the control slide is arranged to be actuated by an electromagnet as a function of parameters of the internal-combustion engine in one of two-point operation and continuous operation such that one of the second and third pressure ducts is connected with the main duct.

14. The arrangement according to claim 13, wherein when one of the second and third pressure ducts is acted upon by pressure, the other of the second and third pressure ducts is used for unpressurized oil return flow.

15. The arrangement according to claim 14, wherein each of the second and third pressure ducts, via a valve, is connected with a return flow duct, and the valves are arranged to be closable by valve cylinders of the control slide.

16. The arrangement according to claim 15, wherein the second and third pressure ducts and the return flow ducts are connected to a housing bore in which the control slide is longitudinally sealingly guided and which, on an end side, can be closed off by the valve cylinders of the control slide.

17. The arrangement according to claim 13, wherein for continuous shifting of the control slide, a power supply to the electromagnet is changed proportionally to a parameter of the internal-combustion engine.

18. The arrangement according to claim 13, wherein the control slide is operatively arranged to be actuated by the electromagnet when the temperature of the internal-combustion engine is above approximately 40° C.

19. The arrangement according to claim 13, wherein the internal-combustion engine has two cylinder banks, a control part for hydraulic pressure, comprising the main duct, the connection duct and the valves as well as the control slide with the electromagnet controlling the valves and the slide is housed in a separate component from which the pressure ducts start out leading to a tensioning and adjusting part arranged on each cylinder bank, the tensioning and adjusting part comprising the two hydraulic pistons, the pressure connections and the coil compression springs.

20. The arrangement according to claim 2, wherein a position of the adjustment member is sensed by a sensor whose signal is used as a control variable during a continuous adjustment and/or as a test signal for the operability of the tensioning drive.

21. The arrangement according to claim 1, wherein when the adjustment function of the device is defective, the driving camshaft is automatically brought into the relative rotational position assigned to an idling operation of the internal-combustion engine.

22. The arrangement according to claim 1, wherein a tensioning device is applied to the exterior side of the loose end and of the load end of the drive.

23. The arrangement according to claim 22, wherein the tensioning device is actuated hydraulically, and an adjusting member associated with the device is used for the adjustment.

24. The arrangement according to claim 22, wherein the tensioning device includes tension rollers applied to the drive.

* * * * *